United States Patent [19]

Hostetler et al.

[11] Patent Number: 4,975,525

[45] Date of Patent: Dec. 4, 1990

[54] FORMATION OF DISCRETE POLYALKYLENE CARBONATE PARTICLES BY SOLVENT/NON-SOLVENT PRECIPITATION

[75] Inventors: Donald E. Hostetler, Wilmington, Del.; Michael J. Cannarsa, Lafayette Hill; Haven S. Kesling, Jr., Drexel Hill, both of Pa.; Hsiang-Ning Sun, Houston, Tex.

[73] Assignee: Arco Chemical Technology, Inc., Wilmington, Del.

[21] Appl. No.: 329,238

[22] Filed: Mar. 27, 1989

Related U.S. Application Data

[63] Continuation-in-part of Ser. No. 171,349, Mar. 21, 1988, abandoned.

[51] Int. Cl.$^5$ ............................................... C08G 64/40
[52] U.S. Cl. ................................ 528/492; 528/370; 528/491; 528/493; 528/494; 528/496
[58] Field of Search ............... 528/370, 405, 491, 492, 528/493, 494, 496

[56] References Cited

U.S. PATENT DOCUMENTS

| | | | |
|---|---|---|---|
| 3,301,824 | 1/1967 | Hostettler et al. | 528/370 X |
| 3,362,669 | 1/1972 | Lundberg et al. | 528/370 X |
| 3,706,713 | 12/1972 | Hull et al. | 528/408 X |
| 3,900,424 | 8/1975 | Inoue et al. | 528/361 X |
| 3,953,383 | 4/1976 | Inoue et al. | 528/413 |
| 4,066,630 | 1/1978 | Dixon et al. | 528/370 X |
| 4,145,525 | 3/1979 | Dixon et al. | 528/370 X |
| 4,166,898 | 9/1979 | Kambe et al. | 528/413 X |
| 4,500,704 | 2/1985 | Kruper et al. | 528/370 X |

*Primary Examiner*—Earl Nielsen
*Attorney, Agent, or Firm*—Stephen D. Harper

[57] ABSTRACT

Discrete, non-agglomerating particles of polyalkylene carbonate are produced by solvent/non-solvent precipitation using certain solvent/non-solvent systems. The free-flowing particles obtaine are from 30 to 3000 microns in diameter and are suitable for use in a variety of applications, particularly the preparation of foamed articles.

19 Claims, No Drawings

FORMATION OF DISCRETE POLYALKYLENE CARBONATE PARTICLES BY SOLVENT/NON-SOLVENT PRECIPITATION

This application is a continuation-in-part of application Ser. No. 07/171,349, filed Mar. 21, 1988, now abandoned.

BACKGROUND OF THE INVENTION

The present invention pertains to a process for producing free-flowing, non-agglomerating particles of a polyalkylene carbonate.

Thermoplastic polymers are commonly processed into many different physical forms such as particles, extrudates, sheets, pellets, and the like. The specific physical form selected will be determined by the ultimate end use and the properties of the polymer. Although certain thermoplastic polymers may be obtained in the desired shape and form directly from the polymerization reaction (as in suspension polymerization, for example), most must be re-processed into a useful physical form following polymerization.

Polyalkylene carbonates may be prepared by the copolymerization of carbon dioxide and one or more alkylene oxides. These polymers, which are comprised of alternating carbon dioxide and alkylene oxide monomer units, are generally obtained in the form of slabs following separation of the polymer from the solvent and catalyst used in the polymerization process. Although the slabs can be ground into a form acceptable for many applications, it may be desirable to convert the slabs into other physical shapes which are better suited for use in specific applications.

Polyalkylene carbonates have been employed in the preparation of molded foam patterns for use in lost foam casting (U.S. Pat. Nos. 4,773,466 and 4,633,929). One of the primary advantages of using a polyalkylene carbonate foam pattern in evaporative casting is that the polymer decomposes smoothly and without violent evolution of gas when it comes into contact with the molten metal during the casting process. The castings thus obtained have smooth surfaces with no significant defects due to carbon deposits.

To form the molded foam pattern, small particles of the polyalkylene carbonate can be suspended in water, impregnated with a volatile blowing agent, pre-expanded by exposure to steam, and then molded into the desired shape by further heating. For this application, it has been found that the polyalkylene carbonate particles should be relatively dense in order that the blowing agent be substantially retained after impregnation. It is also highly desirable that the particles be free-flowing, non-agglomerating, and substantially spherical in shape. These characteristics result in easier handling during the process used to form the molded foam pattern and also result in higher quality patterns. Furthermore, the particles should be substantially free of any unreacted alkylene oxide monomer, cyclic carbonate, low molecular weight oligomers, and solvent as these impurities will act as plasticizers and lower the glass transition temperature. The polyalkylene carbonate should have a glass transition temperature significantly above room temperature so that the discrete particles do not soften and agglomerate during handling and so that the molded foam patterns retain their shape in a warm environment. This is particularly critical when the polyalkylene carbonate employed is polypropylene carbonate, which has a glass transition temperature of only about 42° C. even when highly pure.

Solvent/non-solvent precipitation is a technique commonly employed to isolate a polymer in solid form from a solution.

U.S. Pat. Nos. 3,953,383, 4,166,898, 3,900,424, and 4,500,704 teach to dissolve polyalkylene carbonates in certain solvents and to precipitate the polymers by adding the polymer solutions to certain non-solvents. The preparation of discrete, non-agglomerating particles is not taught by these references; descriptions of the physical form of the precipitated polymers obtained are not given. The specific solvent/non-solvent pairs taught are limited to chloroform/acetone, methylene chloride/acetone, tetrahydrofuran/water, dioxane/dilute aqueous hydrochloric acid, and tetrahydrofuran/dilute aqueous hydrochloric acid when the polyalkylene carbonate is an ethylene oxide/carbon dioxide copolymer and to chloroform/methanol, methylene chloride/methanol, tetrahydrofuran/methanol, tetrahydrofuran/aqueous acidic methanol, and benzene/methanol when the polyalkylene carbonate is a copolymer of carbon dioxide and an epoxide other than ethylene oxide.

U.S. Pat. Nos. 4,066,630 and 4,145,525 teach the precipitation of end-capped polyethylene carbonate and polypropylene carbonate from a chloroform solution using methanol as a non-solvent. Again, the physical form of the precipitate is not described and there is no suggestion that discrete, free-flowing particles from 30 to 3000 microns in diameter may be obtained by this method.

U.S. Pat. No. 3,706,713 teaches the precipitation of polyalkylene carbonates from a toluene + heptane solution using methanol as a non-solvent. The precipitate thus obtained is described as a white, free-flowing powder when the alkylene oxide in the polyalkylene carbonate is cyclohexene oxide.

SUMMARY OF THE INVENTION

It has been found that discrete particles of a polyalkylene carbonate are obtained by dissolving the polymer in a solvent and then precipitating the polymer by combining the polymer solution with a non-solvent. The process of this invention yields spherical, free-flowing, non-agglomerating polymer particles which are substantially free of plasticizing impurities. The particle size distribution obtained is generally narrow and may be varied as desired between about 30 and 3000 microns. The polyalkylene carbonate particles resulting from the process of this invention are particularly suitable for use in the preparation of molded foam patterns.

DETAILED DESCRIPTION OF THE INVENTION

This invention provides a method for producing discrete particles of a substantially alternating carbonate copolymer of at least on alkylene oxide and carbon dioxide comprising the steps of: (a) dissolving the alternating carbonate copolymer in a suitable solvent to form a solution; (b) combining a suitable non-solvent with the solution at a rate and with an agitation such that the alternating carbonate copolymer precipitates in the form of discrete particles having a particle size of from about 30 to 3000 microns in diameter; and (c) separating the discrete particles from the solvent and non-solvent. The solvent and non-solvent are a solvent/non-solvent pair selected from the group consisting of amides/water, amides/aqueous aliphatic alcohols, glycol ethers/water, glycol ether esters/aliphatic alcohols, cyclic aliphatic carbonates/aqueous aliphatic alcohols, aliphatic esters/aliphatic hydrocarbons, aliphatic dibasic esters/aliphatic alcohols, aliphatic ketones/water, aliphatic ketones/aliphatic hydrocarbons, and aromatic hydrocarbons/aliphatic hydrocarbons, wherein the aliphatic alcohols contain from two to four carbon atoms. The solvent and non-solvent are at least partially soluble in each other.

The polyalkylene carbonates suitable for use in the process of this invention may be prepared by any of the methods known in the art. For example, one or more alkylene oxides may be copolymerized with carbon dioxide in a solvent such as methylene chloride or hexane at 100 to 700 psig carbon dioxide pressure using a zinc carboxylate catalyst at 25 to 100° C. for up to 40 hours. Copolymerizations of this type are described in Soga et al *Polymer J.* 13, 407(1981) and Inoue *Makromol Chem., Rapid Commun.* 1, 775(1980). The teachings of these publications are incorporated herein by reference. Suitable alkylene oxides include ethylene oxide, propylene oxide, 1,2-butene oxide, isobutylene oxide, 2,3-butene oxide, cyclopentene oxide, cyclohexene oxide, cycloheptene oxide and mixtures thereof. Terpolymers of propylene oxide, cyclohexene oxide, and carbon dioxide are particularly desirable for the production of molded foam patterns. The process of this invention is especially useful for the preparation of discrete particles of polyalkylene carbonates having glass transition temperatures of from about 10 to 115° C., including propylene oxide/cyclohexene oxide/carbon dioxide terpolymers and polypropylene carbonate. Although the polyalkylene carbonates consist substantially of alternating alkylene oxide/carbon dioxide monomer units (i.e., the molar ratio of alkylene oxide to carbon dioxide is 1:1), some polyether linkages may also be present as a result of the polymerization process used. The number average molecular weight of the polyalkylene carbonate can be from about 10,000 to 1,000,000, although molecular weights between about 15,000 and 100,000 are preferred.

Specific solvent/non-solvent pairs suitable for use in the process of this invention include N-methylpyrrolidinone/water, propylene carbonate/aqueous ethanol, acetone/water, acetone/hexanes, toluene/hexanes, n-propyl acetate/hexanes, methyl isobutyl ketone/hexanes, dimethyl-formamide/aqueous ethanol, diethylene glycol monomethyl ether/water and methylacetate/hexanes. It is important that the solvent and non-solvent be at least partially soluble in each other. Preferably, the solvent and non-solvent are miscible. It is preferred that the volume ratio of non-solvent be at least about 2:1 (most preferably, at least about 4:1) as lower ratios tend to result in more particle agglomeration than is desirable. The solvent used should be chosen so that a significant concentration (preferably, greater than 5 weight percent) of polyalkylene carbonate can be dissolved in it, but the solvent should not be so strong that it tends to be retained in the precipitated discrete particles and thus plasticize the product obtained. It is for this reason that the solvents used in the prior art, especially tetrahydrofuran and the chlorinated hydrocarbons, are generally not suitable for use in the preparation of discrete non-agglomerating particles of polyalkylene carbonates.

The particle size and particle size distribution are controlled by varying the solvents, agitation rate, temperature, and polymer concentration.

The temperature of precipitation is generally between the freezing point and boiling point of the polymer solution used. These temperatures can be different from those of the pure solvent. Temperatures close to ambient temperature are preferred in order to minimize utility costs. Lower precipitation temperatures are also preferred if the polyalkylene carbonate has a relatively low glass transition temperature. Pressures can be used if higher temperatures are desirable. Polymer concentration can be varied, depending on the polymer composition, agitation rate, choice of solvent/non-solvent pair, and the desired particle size. Agitation rates are of great importance. They are usually in the broad range of 10 rpm to 5000 rpm, but are generally selected so that the polymer solution is mixed rapidly into the non-solvent or vice-versa upon combining the two components.

Other materials such as ionic or non-ionic surfactants can be added to facilitate the precipitation of the desired discrete particles. The polymers may also contain various other additives such as pigments, stabilizers, flame retardants, antistatic agents, and flow agents so long as they do not interfere with the desired properties of the product.

Although it is preferred to add the polymer solution to the non-solvent, the opposite order of addition may also be practiced in the process of this invention. Alternatively, the non-solvent and the polymer solution may be simultaneously added to a vessel in order to precipitate the discrete particles. The rate at which the polymer solution and the non-solvent are combined may be varied to adjust the average particle size, but in general this rate can be increased as the agitation rate is increased.

After precipitation of the discrete particles, the particles can be separated from the solvents using any method known in the art for recovering solids from a liquid medium. Such methods include, but are not limited to, filtration and centrifugation. The separated particles may then be washed with additional non-solvent or a mixture of solvent and non-solvent and then dried using any suitable method to remove volatile impurities.

The discrete particles produced by the process of this invention are suitable for use in any application in which small beads of polyalkylene carbonate are desirable. The discrete particles are advantageously formed into molded foam patterns for use in lost foam casting using the methods described in U.S. Pat. No. 4,763,715, the teachings of which are incorporated herein by reference. Other applications for the discrete polyalkylene carbonate particles will be apparent to those skilled in the art.

The following examples are meant to further illustrate, but not limit, the invention. All parts and percentages are by weight unless otherwise designated.

EXAMPLE 1

Preparation of Polypropylene Carbonate

A 500 ml stainless steel autoclave was charged with 30 g of propylene oxide, 909 of methylene chloride, and carbon dioxide and the mixture was polymerized using a zinc carboxylate catalyst according to the method described by Inoue [*Makromol. Chem., Rapid Commun.* 1, 775(1980)] Methanol was added to the methylene chloride solution to precipitate large lumps of aggomerated polypropylene carbonate. This demonstrates that the prior art solvent/non-solvent precipitation methods are not suitable for the preparation of discrete, free-flowing particles of polyalkylene carbonate. The precipitated polymer weighed 24.99 g after drying. The polymer was at least 99% pure polypropylene carbonate as determined by NMR and infrared spectroscopy.

Other polyalkylene carbonates were prepared by the same procedure using cyclohexene oxide or cyclopentene oxide, instead of the propylene oxide.

EXAMPLE 2

Preparation of a Propylene Oxide/Cyclohexene Oxide/Carbon Dioxide Terpolymer

A five gallon stainless steel reactor was charged with 1373 g of cyclohexene oxide, 369 g of propylene oxide, 4971 g of methylene chloride, and carbon dioxide and the mixture was polymerized using a zinc carboxylate catalyst according to the method described by Soga et al [Polymer J. 13, 407(1981)]. Following precipitation and drying of the product, 1506 g of the desired terpolymer were obtained. Nuclear magnetic resonance (NMR) and infrared spectroscopy showed that the product was at least 99% pure carbonate terpolymer.

EXAMPLE 3

To illustrate the preparation of discrete polymer particles according to the present invention, a 10 wt. % solution of the polypropylene carbonate was prepared by dissolving 10 g of the polymer obtained from Example 1 in 90 g of commercially available N-methyl-2-pyrrolidinone solvent. This solution was added with vigorous agitation at a rate of 15 g/minute to 250 g of distilled water maintained at 26° C. Fine, discrete polymer particles were obtained as a slurry. The particles were recovered at room temperature by filtration. The particles were dried at 25° C. in vacuo to give 8.6 g of free-flowing polymer particles between 160 and 600 microns in diameter.

EXAMPLE 4

An 18 wt. % solution of PO/CHO/$CO_2$ terpolymer was prepared by dissolving 36 g of polymer from Example 2 in 160 g N-methyl pyrrolidinone. This solution was added at a rate of 25 g/minute to 1000 ml of water with vigorous agitation at room temperature. A slurry of fine discrete particles was obtained. The particles were filtered, rinsed with water, and dried at 50° C. in vacuo yielding 35 g of particles in the 50 to 1000 micron range.

EXAMPLE 5

An 18 wt. % solution of PO/CHO/$CO_2$ terpolymer was prepared by dissolving 36 g of polymer Example 2 in 164 g of Dupont Dibasic Esters (a mixture of the dimethylesters of $C_4$–$C_6$ dicarboxylic acids). This solution was added to 1000 ml of ethyl alcohol at a rate of 26 g/min at room temperature with vigorous agitation. A slurry of fine discrete particles was obtained. The particles were filtered, rinsed with ethyl alcohol and dried in vacuo yielding 35.5 g of particles in the 50 to 800 micron range.

EXAMPLE 6

An 18 wt. % solution of PO/CHO/$CO_2$ terpolymer was prepared by dissolving 36 g of polymer from Example 2 in 164 g of ethylene glycol monoethyl ether acetate. This solution was added to 1000 ml of isopropyl alcohol with vigorous agitation at room temperature. A slurry of fine discrete particles was obtained. The particles were filtered, rinsed with ethyl alcohol and vacuum dried yielding 35.8 g particles in the 50 to 1000 micron range.

EXAMPLE 7-17

Similar experiments were carried out with different solvent/non-solvent pairs for the PO/$CO_2$ copolymer, PO/CHO/$CO_2$ terpolymer and copolymers containing cyclohexene oxide, cyclopentene oxide, or cis-2-butene oxide instead of the propylene oxide. The results are shown in Table I.

TABLE I

| EXAMPLE | POLYMER* | SOLVENT | NON-SOLVENT | PARTICLE SIZE, MICRONS |
|---|---|---|---|---|
| 7 | PO/CHO/$CO_2$ (EX. 2) | Propylene carbonate | Ethanol/water | 100–1000 |
| 8 | PO/CHO/$CO_2$ (EX. 2) | Dimethylformamide | Ethanol/water | 50–800 |
| 9 | PO/$CO_2$ (EX. 1) | Di-et glycol mono me ether | Water | 150–500 |
| 10 | CHO/$CO_2$ (EX. 1) | Propylene carbonate | Ethanol/water | 200–800 |
| 11 | CPO/$CO_2$ (EX. 1) | N-methyl pyrrolidinone | Water | 200–800 |
| 12 | PO/$CO_2$ (EX. 1) | N-propyl acetate | Hexanes | 100–500 |
| 13 | PO/$CO_2$ (EX. 1) | Methyl isobutyl ketone | Hexanes | 50–500 |
| 14 | PO/CHO/$CO_2$ (EX. 2) | Toluene | Hexanes | 50–800 |
| 15 | CHO/$CO_2$ (EX. 1) | Toluene | Hexanes | 50–500 |
| 16 | PO/CHO/$CO_2$ (EX. 2) | Methyl Acetate | Hexanes | 100–500 |
| 17 | PO/CHO/$CO_2$ (EX. 2) | N-Methyl-pyrrolidinone | Water | 200–800 |

*PO/CHO/$CO_2$ = propylene oxide/cyclohexene oxide/carbon dioxide terpolymer
PO/$CO_2$ = propylene oxide/carbon dioxide copolymer
CHO/CO/$CO_2$ = cyclohexene oxide/carbon dioxide copolymer
CPO/$CO_2$ = cyclopentene oxide/carbon dioxide copolymer

We claim:

1. A method for producing substantially spherical discrete particles of a substantially alternating carbonate copolymer of carbon dioxide and at least one alkylene oxide comprising the steps of:
    (a) dissolving the alternating carbonate copolymer in a suitable solvent to form a solution;
    (b) combining a suitable non-solvent with the solution at a rate and with an agitation such that the alternating carbonate copolymer precipitates in the form of substantially spherical discrete particles having a particle size of from about 30 to 3000 microns in diameter; and
    (c) separating the discrete particles from the solvent and non-solvent;

wherein the solvent and non-solvent are a solvent/non-solvent pair selected from the group consisting of amides/water, amides/aqueous $C_2$–$C_4$ aliphatic alcohols, glycol ethers/water, glycol ether esters/$C_2$–$C_4$ aliphatic alcohols, cyclic aliphatic carbonates/aqueous $C_2$–$C_4$ aliphatic alcohols, dialkylesters of aliphatic dicarboxylic acids/$C_2$–$C_4$ aliphatic alcohols, aliphatic esters/aliphatic hydrocarbons, aliphatic ketones/water, aliphatic dibasic esters/$C_2$–$C_4$ aliphatic alcohols, aliphatic ketones/aliphatic hydrocarbons, and aromatic hydrocarbons/aliphatic hydrocarbons and wherein the solvent and non-solvent are at least partially soluble in each other.

2. The method of claim 1 comprising the additional step after step (c) of washing the discrete particles.

3. The method of claim 1 comprising the additional step after step (c) of drying the discrete particles.

4. The method of claim 1 comprising the additional steps after step (c) of first washing the discrete particles and then drying the discrete particles.

5. The method of claim 1 wherein the solvent/non-solvent pair is N-methylpyrrolidinone/water.

6. The method of claim 1 wherein the solvent/non-solvent pair is propylene carbonate/aqueous ethanol.

7. The method of claim 1 wherein the solvent/non-solvent pair is ethylene glycol monoethyl ether acetate/isopropyl alcohol.

8. The method of claim 1 wherein the solvent/non-solvent pair is methyl iso-butyl ketone/hexanes.

9. The method of claim 1 wherein the solvent/non-solvent pair is dimethyl formamide/aqueous ethanol.

10. The method of claim 1 wherein the solvent/non-solvent pair is toluene/hexanes.

11. The method of claim 1 wherein the solvent/non-solvent pair is n-propyl acetate/hexanes.

12. The method of claim 1 wherein the substantially alternating carbonate copolymer is polypropylene carbonate.

13. The method of claim 1 wherein the substantially alternating carbonate copolymer is a terpolymer of propylene oxide, cyclohexene oxide, and carbon dioxide.

14. The method of claim 1 wherein the substantially alternating carbonate copolymer is polycyclohexene carbonate.

15. The method of claim 1 wherein the substantially alternating carbonate copolymer has a glass transition temperature of from about 10 to 115° C.

16. The method of claim 1 wherein the volume ratio of non-solvent to solvent is at least about 2:1.

17. The method of claim 1 wherein the solution is added to the non-solvent in step (b).

18. A method for producing substantially spherical discrete particles of a substantially alternating carbonate copolymer of carbon dioxide and propylene oxide or carbon dioxide, propylene oxide, and cyclohexene oxide comprising the steps of:

(a) dissolving the alternating carbonate copolymer in a suitable solvent to form a solution;

(b) adding the solution to a suitable non-solvent at a rate and with an agitation such that the alternating carbonate copolymer precipitates in the form of substantially spherical discrete particles having a particle size of from about 50 to 1000 microns in diameter wherein the volume ratio of non-solvent to solvent is at least about 2:1;

(c) separating the discrete particles from the solvent and non-solvent; and (d) drying the discrete particles;

wherein the solvent and non-solvent are a solvent/non-solvent pair selected from the group consisting of N-methylpyrrolidinone/water, propylene carbonate/aqueous ethanol, acetone/water, dimethylesters of $C_4$–$C_6$ dicarboxylic acids/ethanol, acetone/hexanes, toluene/hexanes, n-propyl acetate/hexanes, methyl iso-butyl ketone/hexanes, dimethyl formamide/aqueous ethanol, ethylene glycol monoethyl ether acetate/isopropyl alcohol, diethylene glycol monomethyl ether/water and methyl acetate/hexanes and the solvent and non-solvent are miscible.

19. The method of claim 18 comprising the additional step after step (c) and before step (d) of washing the discrete particles.

* * * * *